No. 714,083. Patented Nov. 18, 1902.
J. L. WOLFE.
TRANSMISSION GEARING.
(Application filed Nov. 24, 1900.)
(No Model.)
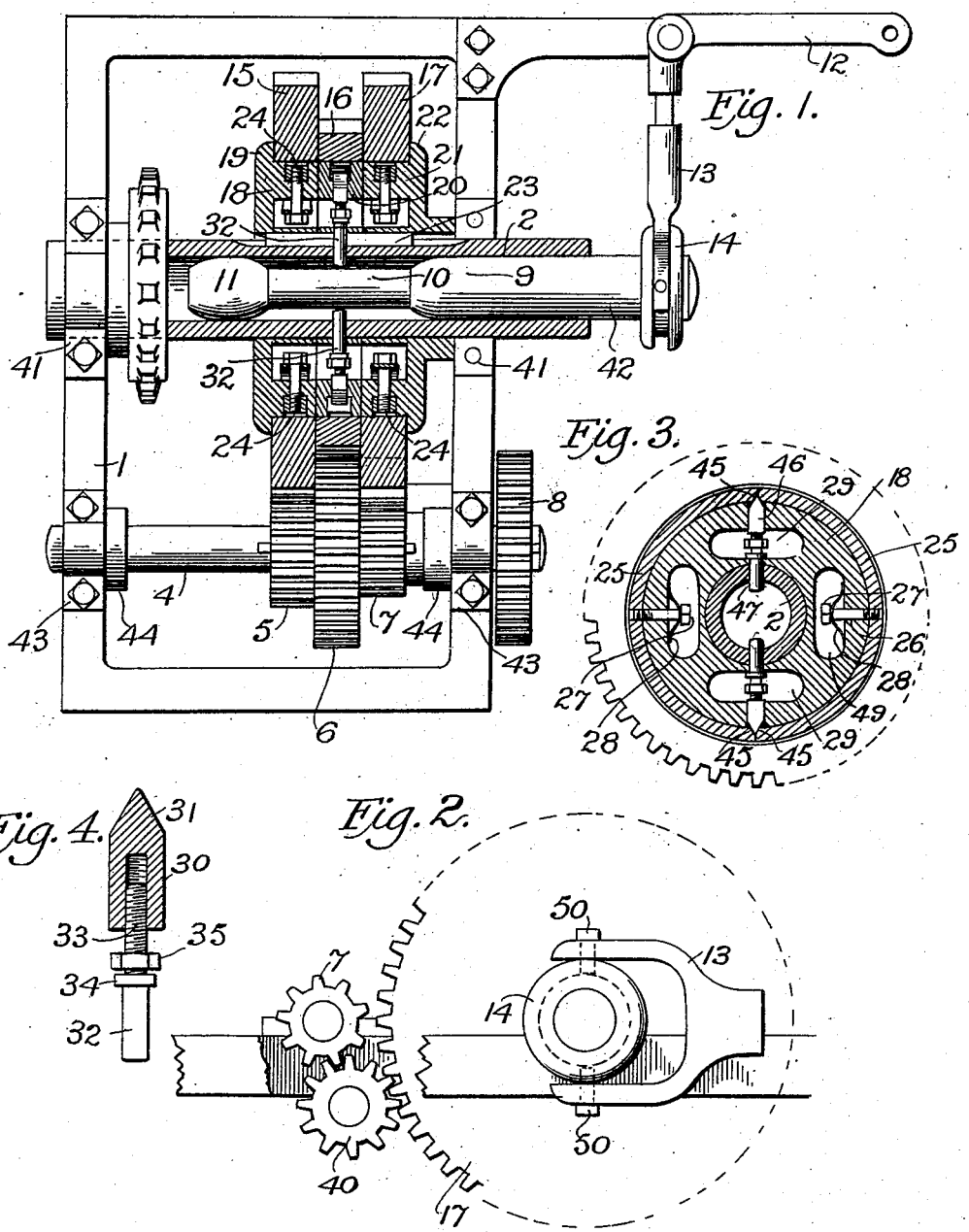
WITNESSES
INVENTOR
Joseph L. Wolfe
per Fred E. Tasker
ATTY

UNITED STATES PATENT OFFICE.

JOSEPH L. WOLFE, OF STAMFORD, CONNECTICUT.

TRANSMISSION-GEARING.

SPECIFICATION forming part of Letters Patent No. 714,083, dated November 18, 1902.

Application filed November 24, 1900. Serial No. 37,594. (No model.)

*To all whom it may concern:*

Be it known that I, JOSEPH L. WOLFE, a citizen of the United States of America, and a resident of the city of Stamford, county of Fairfield, and State of Connecticut, have invented certain new and useful Improvements in Transmission-Gearing, of which the following is a specification.

This invention relates to a transmission-gearing for transmitting power at varying speeds, the object being to provide a gear-changing device suitable for use in connection with automobile mechanism or in any other combination for the transmission of motive power or force from a prime mover or source of motive power to any machine or mechanical part which it may be desired to operate at varying speeds; and the invention therefore consists, essentially, in the construction, arrangement, and combination of parts substantially as will be hereinafter described and then more particularly pointed out in the claims.

In the annexed drawings, illustrating my invention, Figure 1 is a sectional plan view of my improved transmission-gearing. Fig. 2 is a detail side elevation indicating more particularly the arrangement of the gearing for reversing. Fig. 3 is a cross-section of one of the drums or bands and represents in detail the construction and arrangement of the devices for expanding or spreading the clutch-rings. Fig. 4 is a sectional detail view of one of the expanding devices that operate between the contiguous ends of the sections of the clutch-rings.

Similar numerals of reference designate corresponding parts throughout the different figures of the drawings.

The mechanism comprised in my present improvement in transmission-gearing is preferably arranged in connection with some suitable framework—as, for example, the rectangular frame 1, which permits the journaling therein of the shaft 4 and the hollow shaft 2. The shaft 4 is supported revolubly in the frame-bearings 43 43, there being collars 44 44 on the said shaft to keep it in place in its bearings. Said shaft 4 carries a gear-wheel 8, which is driven by the prime mover, which may be a vehicle-motor or any other source of power, said gear-wheel 8 being connected to the prime mover through any suitable intervening gearing arrangement. The gear 8 may be omitted and a direct coupling made. Keyed on the shaft 4 within frame 1 are three gear-wheels or pinions 5, 6, and 7, gear-wheel 6 being used for high speed in a forward direction, gear-wheel 5 being used for slow speed in a forward direction, and gear-wheel 7 being employed for reverse motion, as will be hereinafter more fully pointed out.

The hollow shaft 2 is suitably journaled in the bearings 41 41 on frame 1. On this hollow shaft 2, near one end thereof and within frame 1, is a sprocket-wheel 3, from which power is taken off to drive the wheels of an automobile or to actuate any other driven device in connection with which my invention may be employed. Keyed upon the hollow shaft 2, so as to be firmly fixed and revoluble therewith, are a number of suitable drums or band-wheels, preferably three, 18, 20, and 21, said drum 18 having a flange 19 and said drum 21 having a flange 22, which flanges 19 and 22 project slightly beyond the periphery of the drums to which they belong, as is clearly shown in Fig. 1, in order that the loose gear or toothed rings 15, 16, and 17 may surround, respectively, drums 18, 20, and 21 and may revolve on said drums at certain times, being kept in place between the flanges 19 and 22, as is illustrated in Fig. 1. The gear-ring 15 meshes with the gear-wheel 5, the gear-ring 16 meshes with the gear-wheel 6, and the gear-ring 17 meshes with the intermediate pinion 40, which in turn engages the teeth of the gear wheel or pinion 7. Thus it will be seen that the positive revolution of the shaft 4 and the gear-wheels 5, 6, and 7, which are carried thereby, will revolve the gear-rings 15, 16, and 17 upon their respective drums unless one or the other of said gear-rings is clutched tightly to its drum, in which case the movement of this particular gear-ring will be transmitted to the hollow shaft 2, and it in turn will be driven either at a faster or slower speed or in a forward or reverse direction, accordingly as the clutching is effected upon one or the other of the gear-rings, as will be more fully set forth in the following description.

In each of the drums 18, 20, and 21 is a circumferential groove 24, and in each groove is a friction-clutch consisting of an expansion-ring and made in two parts or halves 25 25, the ends of which abut against each other, as shown in Fig. 3, and are slightly rounded or inclined at 45 45 to permit the introduction between them of the point 31 of the expanding device 30, which operates to spread these ring-sections 25 25 slightly apart, so as to throw their circular periphery more or less out of the containing circumferential groove 24 and into frictional or binding contact with the inner surface of the gear-rings 15, 16, or 17, as the case may be. The expanding device to which we are now referring, is shown in detail in Fig. 4 and consists, essentially, of the block 30, having the inclined or beveled point 31 and having also an internal screw-threaded bore that receives the screw-threaded end 33 of a bolt 32, on which is a fixed collar 34, while on the screw-threaded portion 33 is a lock-nut 35, which is adapted to lock the screw 33 in any position in which it may be adjusted within the bore of the block 30. Obviously as there are two of the ring-sections 25 I employ two of these expanding devices therefor. At two points, as 29 29, in each of the drums there is a cut-out place wherein the nut 35 is situated and is operative, it being observed by reference to Fig. 3 that the block 30 is movable through a rectangular opening 46 in the outer part of the drum, while the bolt 32 is movable through an opening 47 in the inner portion of the drum and also in the shaft 2, the inner end of said bolt 32 projecting into the interior of the shaft 2, so as to be in a position to be adjusted endwise through the agency of a reciprocating plunger in said hollow shaft, to be hereinafter more fully described, in order to adjust the bevel-point 31 of the expander, to the end that the friction-clutch may be put into action or made idle. It will be further observed that in the drums at points between the cut-out portions 29 29 are other cut-out portions 49, which receive the heads 27 of bolts 26, that pass through the inner portions of the drums and are screwed into the rings 25, there being below each head 27 and between it and the adjoining edge of the recess 29 a flat spring 28, the effect of which is to draw the ring-sections 25 25 toward the center of the drum—that is to say, toward the bottom of their containing recesses 24. Thus it will be understood that when the expanding devices are actuated to thrust their bevel ends 31 outward between the ring-sections 25 25 said sections will be forced apart and the rings expanded; but when the points 31 are retracted the result will be to allow sections 25 25 to close together again or to become again seated in the bottom of the recesses 24 through the agency of the springs 28 acting on the bolts that are firmly connected to the sections 25 25.

Within the hollow shaft 2 is a rod or plunger 42, adapted to be reciprocated back and forth through the agency of some suitable leverage device—as, for instance, the bell-crank 12, which is pivoted at one corner of the main frame and which engages a fork 13, that is pivoted by the pins 50 to the spool 14, which is keyed upon the end of the rod or plunger 42, so as to revolve therewith. The rod 42 has a differential diameter, one section, as 9, being of a proper diameter to substantially fill the hollow interior of shaft 2, another section, as 10, being of a reduced diameter, and another terminal section, as 11, having the same diameter as section 9, but with its ends preferably somewhat rounded, as shown in Fig. 1. As this rod slides back and forth within the shaft 2 the sections of different diameter will be brought alongside of and opposite to the inner ends of the pins 32. When the part 10 of reduced diameter is opposite said pins 32, they are permitted to project more or less into the interior of the shaft 2; but when the part 11 contacts with said pins they are forced outwardly, and the result of this action is to drive the wedging ends 31 between the duplicate sections of the expansible ring and expand the latter.

Therefore from the foregoing description and detail of the construction of the various parts of my improved transmission-gearing the operation will be plainly evident. If the rod 42 occupies the position shown in Fig. 1, all three of the rings will be retracted into their several recesses and motion will not be communicated from the shaft 4 to the shaft 2, for the gear-rings 15, 16, and 17 will revolve idly upon their respective drums. If rod 42 is moved toward the right, so that the section 11 thereof acts to force outward the expanding devices of drum 18, then the gear-ring 15 will be clamped to the drum 18, and the result will be a propulsion of the shaft 2 in a forward direction at a comparatively slow speed. If the rod 42 is moved still farther to the right, so that its section 11 can act upon the expanding devices belonging to drum 20, the result will be to relieve the clutching effect between drum 18 and ring 15 and to cause ring 16 to be clutched upon drum 20, thereby making shaft 2 to revolve in a forward direction at a much faster speed. When it is desired to effect a reverse motion, the rod 42 will be moved toward the left, so as to bring the section 9 into active work against the expanding devices belonging to drum 21, it being noted that at the same time the clutching of drums 18 and 20 will be relieved, and the effect of clutching the expansible ring of drum 21 against the inner surface of the reverse gear-wheel 17 will be to communicate a reverse motion to shaft 2.

The specific form of the mechanism of my improved transmission-gearing, in so far as its various details are concerned which I have delineated in the drawings and described herein, is only one embodiment of the invention, and I do not wish to be restricted or confined thereto, but reserve the liberty of so varying the construction and combination as may be found essential to adapt the devices to different situations and to enable the invention to serve its purpose with equal efficiency under all circumstances.

Having thus described my invention, what I claim as new, and desire to secure by Letters Patent, is—

1. In a gear-changing mechanism, the combination with a hollow shaft, of a plurality of drums fast thereon, a plurality of gear-rings loose on the said drums, sectional expansible rings situated in circumferential grooves in the drums so that they can be expanded against the gear-rings, expanding devices which project into the interior of the shaft, and sliding means within the shaft for operating said expanding devices.

2. In a gear-changing mechanism, the combination with a hollow shaft, of a plurality of drums fast thereon, said drums having each a circumferential groove, a plurality of gear-rings loose on the said drums, sectional expansible rings situated in the circumferential grooves in the drums so that they can be expanded against the gear-rings, wedge devices between the adjoining ends of the ring-sections, and a sliding rod within the shaft for actuating the wedge devices.

3. In a gear-changing mechanism, the combination with a hollow shaft, of a plurality of drums fast thereon, a plurality of gear-rings loose on the said drums, sectional expansible rings situated in circumferential grooves in the drums so that they can be expanded against the gear-rings, wedge devices between the adjoining ends of the ring-sections, and pins projecting into the hollow shaft and connected with the wedge devices, together with a sliding rod in the hollow shaft for actuating the said pins, as set forth.

4. The combination with a hollow shaft, of a drum fast thereon and having a groove, an expansible ring in said groove, a gear-ring loose on the drum, devices for expanding said ring consisting of beveled blocks projecting into the interior of the shaft, and sliding means within the hollow shaft for acting against the blocks, together with springs for returning the expansible ring to its normal position after having been expanded.

5. In a gear-changing mechanism, the combination with a hollow shaft, of a grooved drum fast thereon, a gear-ring loose on the drum, an expansible ring between the gear-ring and the drum, spring devices for returning the ring to its normal position after being expanded, and means within the hollow shaft for expanding the ring.

6. The combination with a hollow shaft, of a drum fast thereon, a gear-ring loose on the drum, a sectional expansible ring in a groove of the drum, devices for expanding the ring consisting essentially of beveled blocks, bolts attached thereto and projecting into the interior of the shaft and lock-nuts on said bolts, and a sliding rod within said hollow shaft for operating the expanding devices, together with springs for returning the expansible ring to its normal position after having been expanded.

Signed at Stamford, Connecticut, this 14th day of November, 1900.

JOSEPH L. WOLFE.

Witnesses:
 T. H. WHITE,
 JOHN WHITE.